United States Patent
Kaiser et al.

(10) Patent No.: US 10,801,623 B2
(45) Date of Patent: *Oct. 13, 2020

(54) DEVICE AND METHOD FOR EXTENDING THE LIFESPAN OF A SHAFT SEAL FOR AN OPEN-DRIVE COMPRESSOR

(71) Applicant: THERMO KING CORPORATION, Minneapolis, MN (US)

(72) Inventors: Joseph Robert Kaiser, Cottage Grove, MN (US); David John Dykes, Eagan, MN (US); Ralph David Price, Eden Prairie, MN (US); Ryan Michael Fritts, Maple Grove, MN (US)

(73) Assignee: Thermo King Corporation, Minneapolis, MN (US)

( * ) Notice: Subject to any disclaimer, the term of this patent is extended or adjusted under 35 U.S.C. 154(b) by 285 days.

This patent is subject to a terminal disclaimer.

(21) Appl. No.: 15/891,988

(22) Filed: Feb. 8, 2018

(65) Prior Publication Data
US 2018/0163871 A1 Jun. 14, 2018

Related U.S. Application Data

(63) Continuation of application No. 14/758,731, filed as application No. PCT/US2013/078487 on Dec. 31, 2013, now Pat. No. 9,897,211.
(Continued)

(51) Int. Cl.
*F16J 15/324* (2016.01)
*F04B 39/04* (2006.01)
(Continued)

(52) U.S. Cl.
CPC ......... *F16J 15/324* (2013.01); *F04B 27/0873* (2013.01); *F04B 27/1036* (2013.01);
(Continued)

(58) Field of Classification Search
CPC ........ F16J 15/324; F16J 15/3204; F16J 15/32; F04B 27/0873; F04B 27/1036;
(Continued)

(56) References Cited

U.S. PATENT DOCUMENTS 3,617,155 A 11/1971 Hansen
3,759,532 A 9/1973 Lindeboom
(Continued)

FOREIGN PATENT DOCUMENTS

CN 1314978 9/2001
CN 1620569 5/2005
(Continued)

OTHER PUBLICATIONS

Chinese Office Action issued in Chinese Application No. 201380074017.5 dated Jun. 15, 2016 (5 pages).
(Continued)

*Primary Examiner* — Nathan Cumar
(74) *Attorney, Agent, or Firm* — Hamre, Schumann, Mueller & Larson, P.C.

(57) ABSTRACT

A device and method for extending the lifespan of a shaft seal for an open-drive compressor is provided. The device and method can also reduce and/or prevent deterioration of the shaft seal regardless of the operation condition of the open-drive compressor. The device and method can further reduce and/or prevent leakage of a lubricant and/or refrigerant that can cause deterioration of components within a transport refrigeration unit (TRU).

20 Claims, 16 Drawing Sheets

Related U.S. Application Data

(60) Provisional application No. 61/747,565, filed on Dec. 31, 2012, provisional application No. 61/781,870, filed on Mar. 14, 2013.

(51) Int. Cl.
| | | |
|---|---|---|
| *F04B 39/02* | (2006.01) | |
| *F16J 15/3204* | (2016.01) | |
| *F04B 27/08* | (2006.01) | |
| *F04B 27/10* | (2006.01) | |
| *F04B 39/00* | (2006.01) | |
| *F04B 39/12* | (2006.01) | |
| *F04B 53/18* | (2006.01) | |

(52) U.S. Cl.
CPC .......... *F04B 39/0094* (2013.01); *F04B 39/02* (2013.01); *F04B 39/0207* (2013.01); *F04B 39/0223* (2013.01); *F04B 39/04* (2013.01); *F04B 39/123* (2013.01); *F04B 53/18* (2013.01); *F16J 15/3204* (2013.01)

(58) Field of Classification Search
CPC .. F04B 39/0094; F04B 39/02; F04B 39/0207; F04B 39/0223; F04B 39/04; F04B 39/123; F04B 53/18
USPC ........................................................ 277/551
See application file for complete search history.

(56) References Cited

U.S. PATENT DOCUMENTS

| | | | |
|---|---|---|---|
| 4,071,254 A | 1/1978 | Raimondi et al. | |
| 4,834,627 A | 5/1989 | Gannaway | |
| 6,126,411 A | 10/2000 | Flanigan et al. | |
| 6,210,107 B1 | 4/2001 | Volden et al. | |
| 6,257,368 B1 | 7/2001 | Young | |
| 6,592,337 B2 | 7/2003 | Yamada et al. | |
| 6,698,232 B1 | 3/2004 | Duppert et al. | |
| 7,056,087 B2 | 6/2006 | Dean | |
| 7,153,093 B2 | 12/2006 | Driefert et al. | |
| 7,178,450 B1* | 2/2007 | Baker ................ | F04B 27/1036 92/153 |
| 7,354,216 B2 | 4/2008 | Dunmire et al. | |
| 7,743,694 B2 | 6/2010 | Becker | |
| 7,992,684 B2* | 8/2011 | Thiel .................. | F16H 57/0408 184/12 |
| 2002/0029469 A1* | 3/2002 | Bunch .................... | B23P 19/00 29/857 |
| 2004/0113369 A1 | 6/2004 | Wright et al. | |
| 2004/0262845 A1* | 12/2004 | Matsui ................ | F16J 15/3228 277/349 |
| 2005/0147517 A1* | 7/2005 | Dreifert ................ | F04C 27/009 418/85 |
| 2007/0169998 A1* | 7/2007 | Thiel .................. | F16H 57/0408 184/12 |
| 2008/0122181 A1* | 5/2008 | Grimanis ............. | F16J 15/3232 277/308 |
| 2008/0169157 A1* | 7/2008 | Wyker ................ | F04B 27/1036 184/6.16 |
| 2009/0140495 A1* | 6/2009 | Dreifert ................ | F04C 27/009 277/431 |
| 2010/0148448 A1* | 6/2010 | Pinto ....................... | B22F 5/106 277/371 |
| 2012/0009077 A1 | 1/2012 | Iwano et al. | |
| 2012/0211945 A1 | 8/2012 | Lindner-Silwester et al. | |
| 2012/0247141 A1* | 10/2012 | Lifson ................ | F04B 39/0094 62/243 |

FOREIGN PATENT DOCUMENTS

| | | |
|---|---|---|
| CN | 1902123 | 1/2007 |
| CN | 2861538 | 1/2007 |
| CN | 101156008 | 4/2008 |
| CN | 102695878 | 9/2012 |
| DE | 19963170 | 6/2001 |
| JP | 2006-307700 | 11/2006 |
| WO | 9932587 | 7/1999 |

OTHER PUBLICATIONS

Supplementary European Search Report issued in European Application No. 13869566.3 dated Dec. 21, 2016 (8 pages).
International Search Report and Written Opinion for International Application No. PCT/US2013/078487, dated Apr. 21, 2014 (11 pages).

* cited by examiner

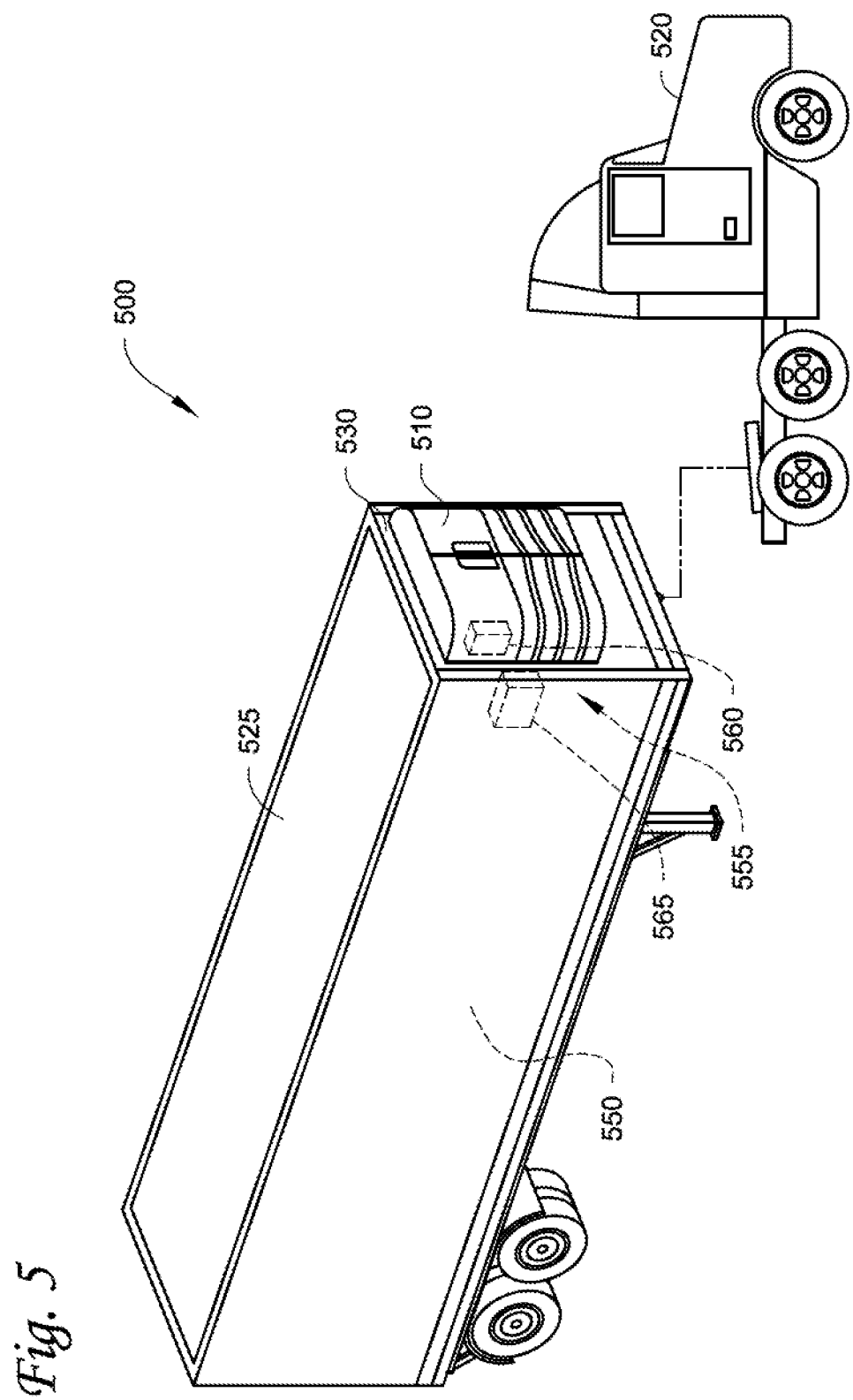

DEVICE AND METHOD FOR EXTENDING THE LIFESPAN OF A SHAFT SEAL FOR AN OPEN-DRIVE COMPRESSOR

FIELD

This disclosure generally relates to devices and methods for extending the lifespan of a shaft seal for an open-drive compressor.

BACKGROUND

Transport refrigeration systems (TRSs) are generally used to cool containers, transport units (TUs) such as trailers, and numerous other types of TUs. A TRS may include a transport refrigeration unit (TRU) that is attached to the TU and provides refrigeration within a cargo space of the TU. The TRU may include, without limitation, a compressor, a condenser, a thermo expansion valve, an evaporator and fans and/or blowers to facilitate heat exchange between the cargo space of the TU and the environment surrounding the TU.

In a cooling cycle, a refrigerant is compressed by the compressor and subsequently flows into the condenser. In the condenser, the compressed refrigerant can release heat to the environment. Then the refrigerant can pass through the thermo expansion valve where it can subsequently flow into the evaporator to absorb heat from air in a space desired to be cooled. A fan and/or blower can be used to facilitate heat exchange between the refrigerant and the environment when the refrigerant is in the condenser and the evaporator by creating air flow through the condenser and the evaporator.

SUMMARY

The embodiments disclosed here are directed to devices and methods for extending the lifespan of a shaft seal for an open-drive compressor.

A shaft seal is used to retain pressurized gas and/or oil inside the housing of an open-drive compressor. The shaft seal generally includes two seal faces that can rotate with respect to each other. A lubricant, such as an oil, is fed in between the two seal faces to prevent damage to the seal faces and seal the gap between their surfaces.

When the open-drive compressor is operating under a compressor suction vacuum condition, a negative pressure with respect to the atmospheric pressure might be created inside the housing of the open-drive compressor. In such case, the lubricant intended for the shaft seal can remove the lubricant from the seal faces. That is, the lack of the internal lubricant at positive pressure can starve the seal faces of the lubricant. This might lead to deterioration of the seal faces, thereby reducing the lifespan of the shaft seal and potentially the open-drive compressor.

When a pressure inside the housing of the open-drive compressor is greater than the atmospheric pressure outside of the housing, the lubricant used by the shaft seal can flow outward from the shaft seal due to the pressure differential. In some embodiments, the open-drive compressor can have a bottle positioned under the shaft seal to collect the leaking oil. The draining of excess oil from the atmospheric side of the seal to the bottle might lead to removal of a small buffer of oil in compressor suction vacuum conditions. The loss of the lubricant might prevent optimal operation of the shaft seal.

This disclosure is related to improve the open-drive compressor for increasing the time of the optimal operation of the shaft seal. Further, this disclosure is related to improving lubricant flow control to prevent unwanted leakage of lubricant and/or refrigerant which might cause deterioration of other components. Further, this disclosure is related to reducing a need to have lubricant sucked (e.g., backflow, reverse flow, etc.) back into the housing of the compressor from the outside.

In some embodiments, a drive ring device is provided that is configured to provide a flow path (e.g., a metered path, channel, groove, etc.) for lubricant to flow from the crankshaft to the shaft seal cavity to supply pressurized lubricant to the shaft seal even when the open-drive compressor is operating in a compressor suction vacuum condition. The drive ring is also configured to act as a surface for an internal lip seal to ride against, and drive the shaft seal with the crankshaft. The lip seal provides a seal for the crankshaft bearing to help maintain a pressurized cavity around the shaft seal.

In other embodiments, a method for extending the lifespan of the shaft seal is provided that limits the continuous time that the open-drive compressor is allowed to stay in a compressor suction vacuum condition. In particular, the method is configured to initiate a positive pressure condition (e.g., at least +10 psig) for a second time period $T_2$ (e.g., ~3 minutes) after the open-drive compressor is determined to have operated in a compressor suction vacuum condition for a continuous first time period $T_1$ (e.g., ~1 hour). After the second time period $T_2$ has lapsed, the open-drive compressor will return to normal operation that allows the open-drive compressor to operate in a compressor suction vacuum condition in order to maintain improved temperature control. The positive pressure condition forces lubricant (e.g., oil) back between the seal faces of the seal shaft. Thus, the shaft seal will not be deprived of lubricant long enough to cause seal face damage and cause a refrigerant or lubricant leak.

In yet some other embodiments, a method for extending the lifespan of the shaft seal is provided that prevents the open-drive compressor from operating in a compressor suction vacuum condition during the first X amount of time (e.g., ~200 hours) of operation. In some embodiments, the open-drive compressor is configured to operate in the positive pressure condition (e.g., at least +10 psig) during the first X amount of time.

BRIEF DESCRIPTION OF THE DRAWINGS

Referring now to drawings in which like reference numbers represent corresponding parts throughout.

FIG. 5 illustrates one embodiment of a TRS comprising a TRU.

DETAILED DESCRIPTION

This disclosure is directed to devices and methods for extending the lifespan of a shaft seal for an open-drive compressor.

The embodiments described herein are directed to a compressor system having an open engine/motor drive (also referred to as an open-drive compressor). More particularly, the embodiments relate to devices and methods for extending the lifespan of a shaft seal for an open-drive compressor by supplying pressurized lubricant (such as oil) in between the face seals of the shaft seal even when the open-drive compressor suction is operating in a compressor suction vacuum condition.

References are made to the accompanying drawings that form a part hereof, and in which is shown by way of illustration of the embodiments in which the methods and systems described herein may be practiced.

Figure 1:
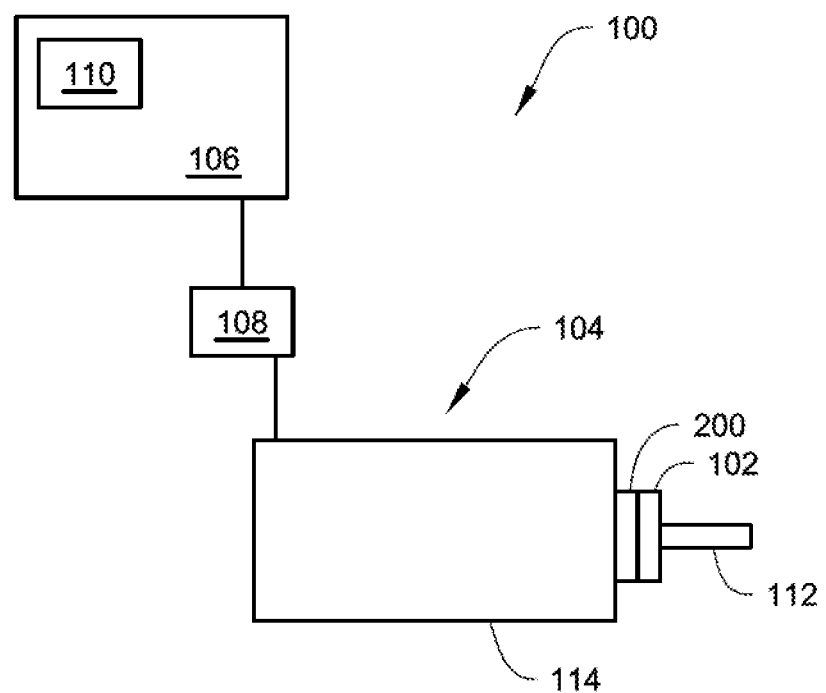
FIG. 1 illustrates a block diagram of a compressor system, according to an embodiment.

FIG. 1 shows a compressor system 100 according to an embodiment that can supply pressurized oil to a shaft seal 102 even when an open-drive compressor 104 is operating in a vacuum or partial vacuum (referred to herein as a compressor suction vacuum condition). The compressor system 100 includes the open-drive compressor 104, a TRS controller 106 that controls an electronic throttle valve (ETV) 108.

The TRS controller 106 includes a processor and computer readable medium 110 that is configured to store and execute computer readable instructions for controlling the ETV 108 according to the methods disclosed herein. The TRS controller 106 can receive compressor suction pressure data from a pressure sensor (not shown) and can control operation of the open-drive compressor 104 by controlling the amount of refrigerant flowing to the open-drive compressor 104 via the ETV 108. By controlling the amount of refrigerant flowing to the open-drive compressor 104, the TRS controller 106 can prevent the open-drive compressor 104 from operating in a compressor suction vacuum condition.

The open-drive compressor 104 has a crankshaft 112 (i.e., open drive shaft) that protrudes out from a shaft seal housing 114 of the open-drive compressor 104. The shaft seal 102 is positioned at a location where the crankshaft 112 meets the housing 114 of the compressor 104. The shaft seal 102 includes two seal faces (not shown) and a shaft seal cavity (not shown). A drive ring 200 is disposed around and near the crankshaft 108 at the location near the shaft seal 102. The drive ring 200 can provide a metered path for the lubricant (e.g., oil) to flow from a crankshaft 112 to the shaft seal cavity. The drive ring 200 (e.g., see FIG. 2B) can also act as a surface for an internal lip seal to ride against. The drive ring 200 can further drive the shaft seal 102 with the crankshaft 112.

Figure 2A:
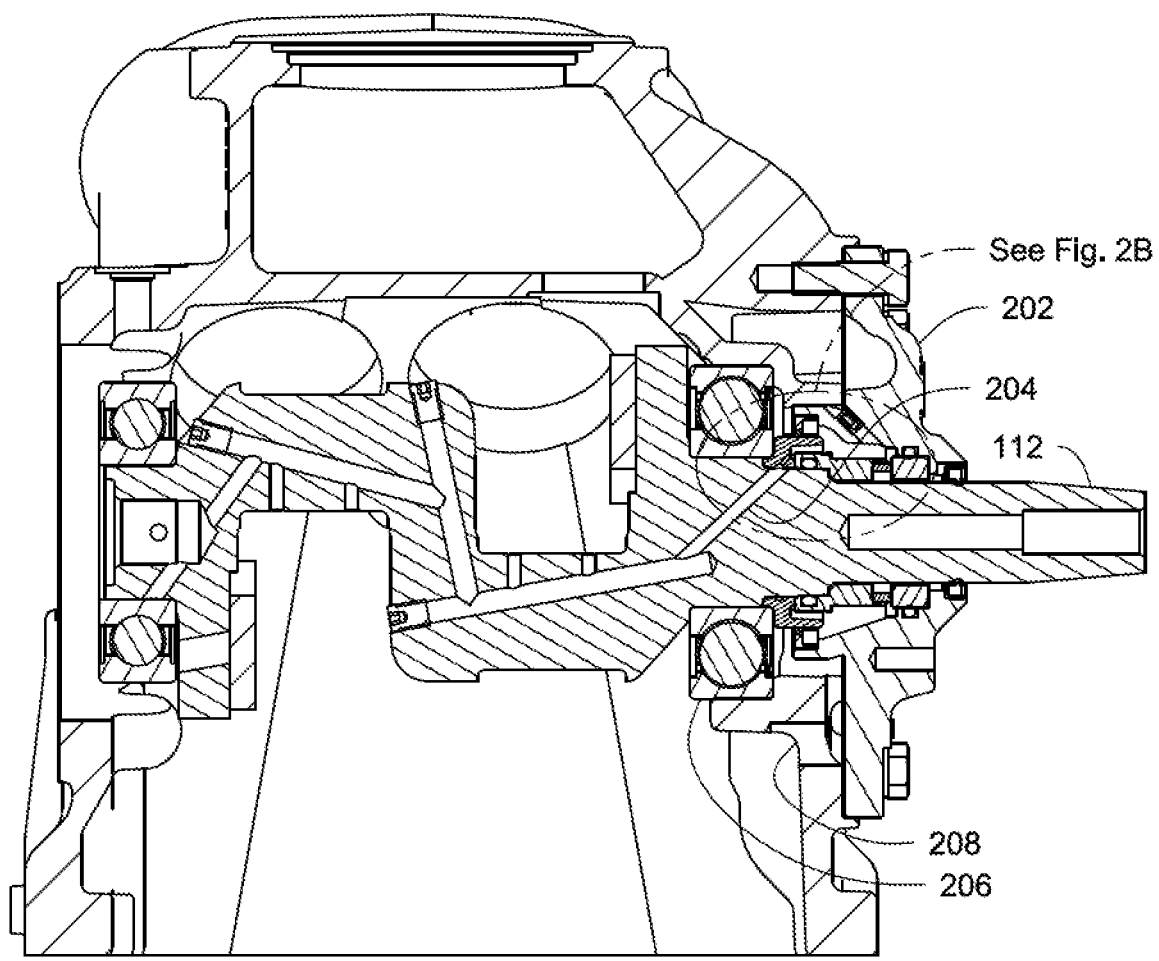
FIG. 2A illustrates a cross-sectional side view of an open drive compressor, according to an embodiment.

FIG. 2A shows a detailed view of a cutaway side view of the open-drive compressor 104. FIG. 2A shows the crankshaft 112 and a shaft seal cover 202. A lubricant flow path 204 (which can be considered to be a portion of a total lubricant flow path in the compressor 104) provides lubricant from a lubricant pump at high pressure to lubricate the shaft seal (102 shown in FIG. 1). After lubrication of the shaft seal 102, the lubricant flows via another lubricant flow path 208 (which can be considered to be another portion of a total lubricant flow path in the compressor 104) for draining the lubricant back to the lubricant pump at a low pressure. The lubricant flow path 204 is upstream of the lubricant flow path 208. FIG. 2A shows a ball bearing 206 that assists in rotating the crankshaft 112. A section of FIG. 2A is shown in greater detail in FIG. 2B.

Figure 2B:
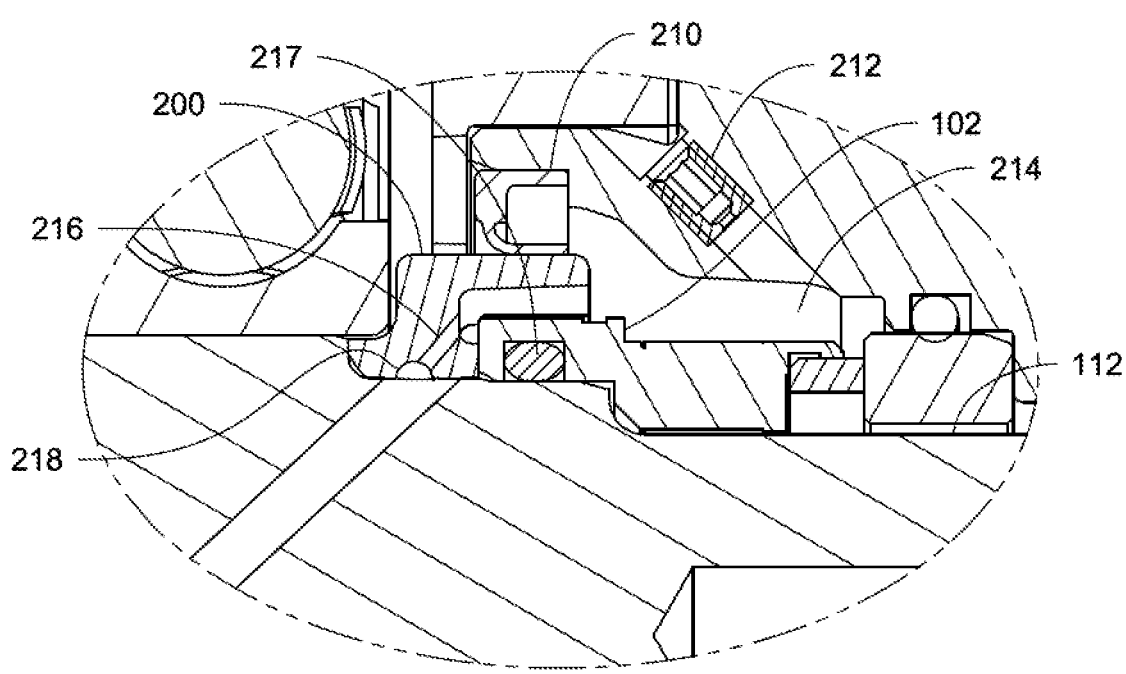
FIG. 2B illustrates a detailed view of a portion of FIG. 2A.

FIG. 2B shows a portion of the cutaway side view shown in FIG. 2A. FIG. 2B shows the crankshaft 112 which is surrounded by a lip seal 210 which covers the shaft seal 102 and the drive ring 200. The shaft seal cover 202 is in contact with the lip seal 210. A shaft seal cavity 214 is disposed in a region defined by the shaft seal cover 202, the shaft seal 102, the drive ring 200, and the lip seal 210. The shaft seal cover 202 includes a shaft seal cavity discharge orifice 212, which acts as a lubricant flow restrictor. The shaft seal cavity discharge orifice 212 restricts the flow of the lubricant to maintain a positive pressure of the lubricant contained in the shaft seal cavity 214. The lubricant flow path 204 is upstream of the shaft seal cavity 214. The lubricant flow path 208 is downstream of the shaft seal cavity 214.

The drive ring 200 includes a lubricant metering hole 216 and a lubricant groove 218. The lubricant metering hole 216 and the lubricant groove 218 provide a path for the lubricant to flow from the crankshaft 112 to the shaft seal cavity 214. Further, the drive ring 200 can act as a surface for the internal lip seal 210 to ride against. Further, the drive ring 200 can drive the shaft seal 102 with the crankshaft 112. An o-ring 217 is disposed between the crankshaft 112 and the shaft seal 102.

The shaft seal cavity 214 is configured to be isolated from the compressor sump, thereby pressurizing the shaft seal cavity 214. The drive ring 200 and the seal cover 202 are configured such that the pressure in the shaft seal cavity 214 is maintained at an intermediate pressure between compressor suction and lubricant pump discharge. This reduces the load on the lip seal 210 as well as providing a fail-safe mode. That is, should the lip seal 210 fail to retain pressure, drive ring 200 allows the crankshaft 112 to maintain full lubricant pump discharge pressure, preventing excessive wear elsewhere in the compressor.

The drive ring 200 provides a mechanical structure for the seal area of the open-drive compressor 104 which changes how the seal environment is sealed. For example, the drive ring 200 can be configured to prevent lubricant from getting sucked back into open-drive compressor 104 (or at least prevents the lubricant from being sucked back into the open-drive compressor 104 too fast). Further, the drive ring 200 and/or other components shown in FIGS. 2A and 2B can retain the lubricant and/or oil in the shaft seal cavity and hold it under pressure while the compressor is running.

The drive ring 200 and/or other components shown in FIGS. 2A and 2B can prevent the lubricant from freely draining away from the shaft seal 102 and maintain a positive pressure of the lubricant in the shaft seal cavity 214. Accordingly, the drive ring 200 and the other components allows the lubricant to drain away only when there is a certain (e.g., predetermine) amount (e.g., pressure and/or volume) of lubricant above a predetermined amount (e.g., pressure and/or volume) near the shaft seal 102 region and/or in the shaft seal cavity 214. By holding a certain amount of lubricant at positive pressure at the shaft seal 102, the lubrication of the shaft seal 102 can be maintained and the working life of the shaft seal 102 can be extended.

Figure 3:
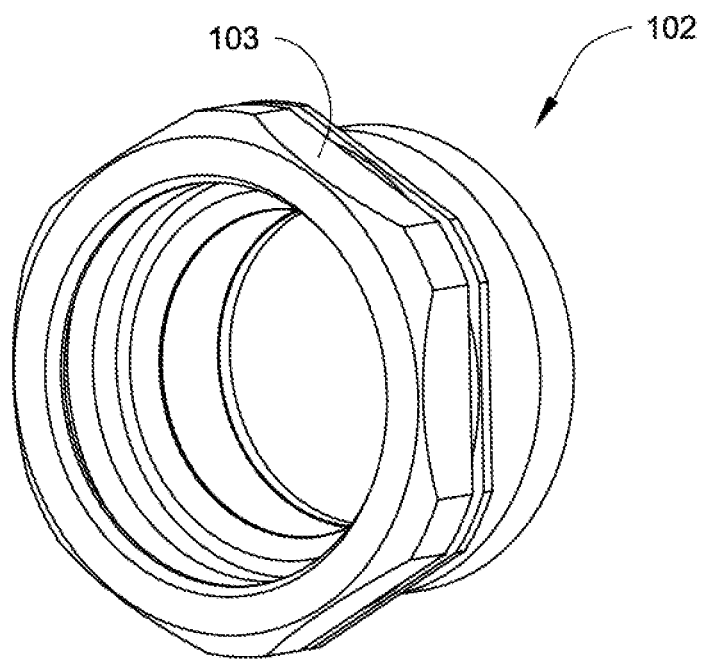
FIG. 3 illustrates a view of a shaft seal, according to an embodiment.

FIG. 3 shows an embodiment of the shaft seal 102. The shaft seal 102 has male engagement surfaces 103 for engaging with female engagement surfaces 302 (shown in FIGS. 4A-C) of the drive ring 200 (shown in FIGS. 4A-C). For example, the male engagement surfaces 103 can have six major surfaces for frictional engagement. Thus, although the actual number of surfaces may be more than six, the embodiment shown in FIG. 3 can be called "hexagon surfaces." In other embodiment, there are three or more major engagement surfaces.

Figure 4A:
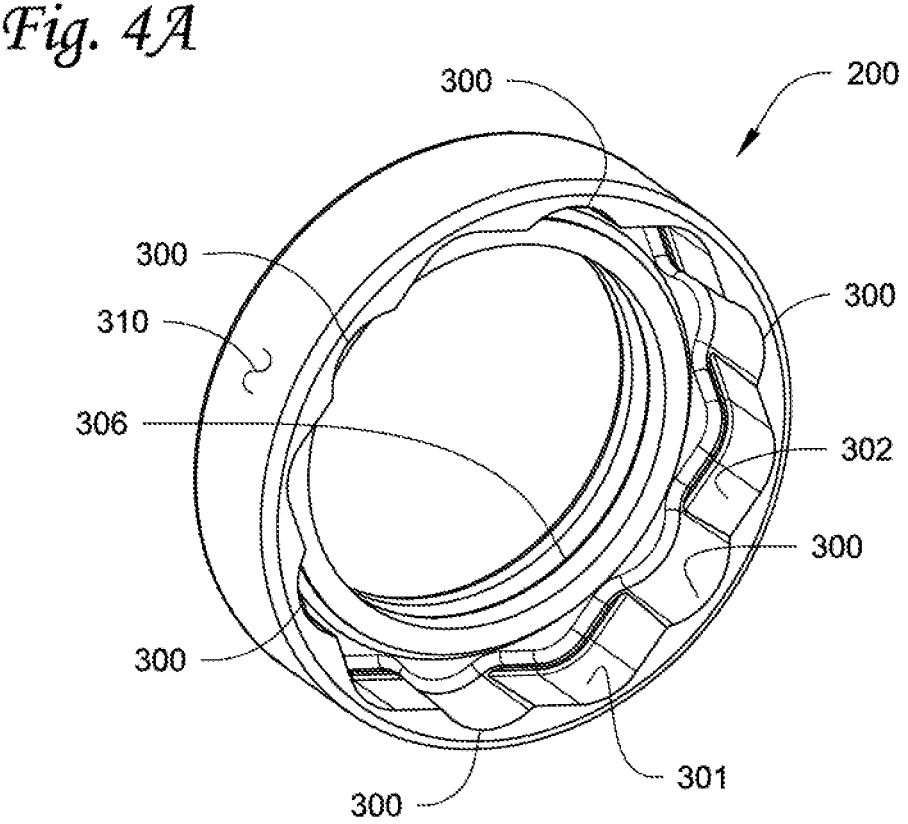
FIGS. 4A-C illustrate various views of a drive ring, according to an embodiment.
Figure 4B:
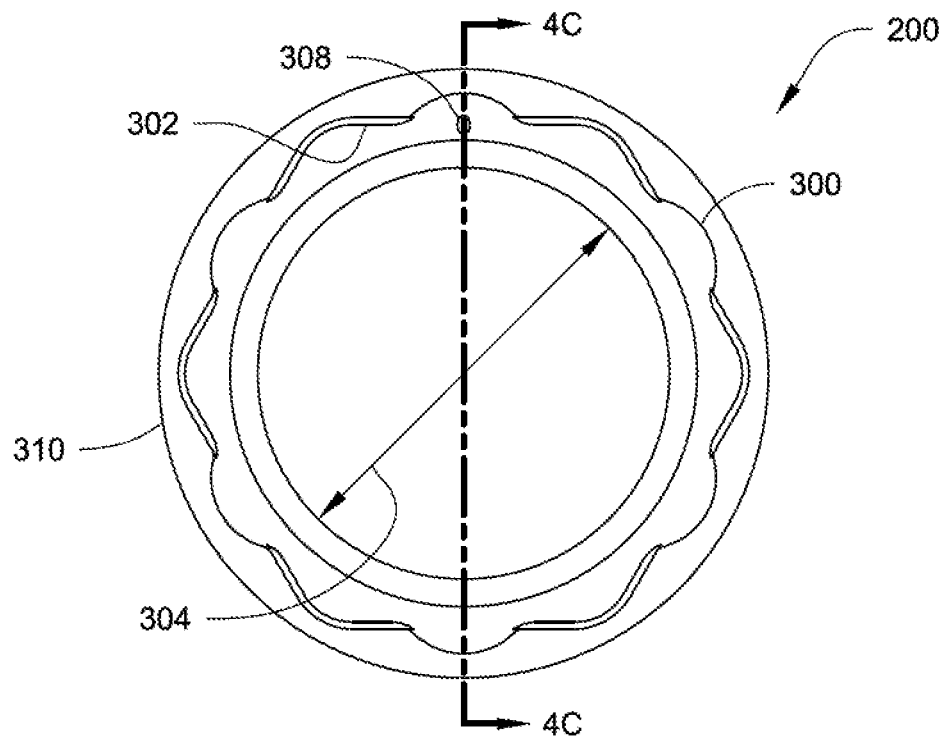
Figure 4C:
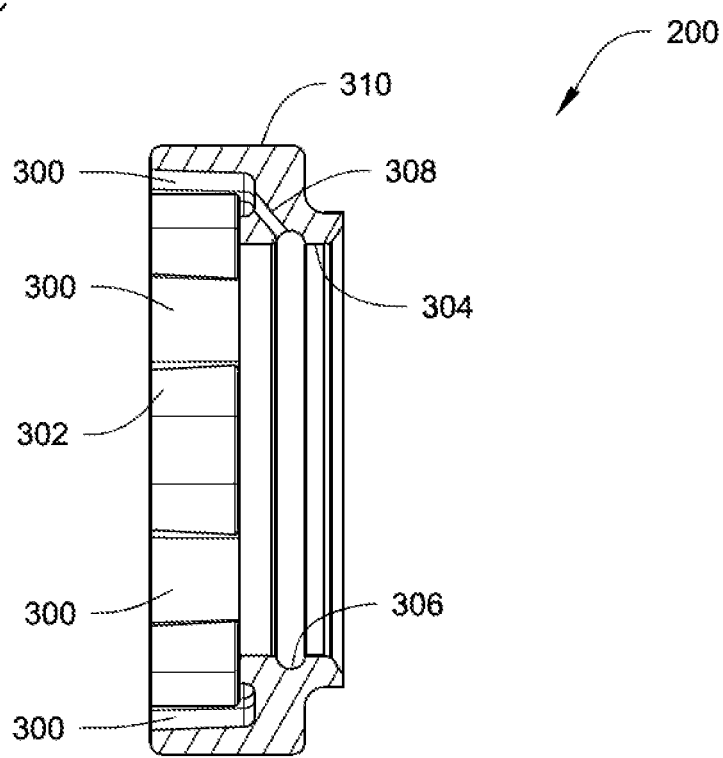

FIGS. 4A-C illustrate various views of an embodiment of a drive ring 200. FIG. 4A shows a perspective view of the drive ring 200. The drive ring 200 includes a plurality of lubricant passages 300 configured to be spaced around a shaft seal (such as the shaft seal 102) and provided along an inner surface 301 of the drive ring 200. The drive ring 200 includes six lubricant passages 300. However, one or more lubricant passages are possible in other embodiments. In some embodiments, the lubricant passages 300 are evenly distributed around a circumference of the inner surface 301 of the drive ring 200. The female engagement surfaces 302 are configured for frictional engagement with the male engagement surfaces 103 of the shaft seal 102. FIG. 4B shows a front view of the drive ring 200, showing the lubricant passages 300 and the female engagement surfaces 302.

FIG. 4C shows a cross-sectional view along 4C-4C line in FIG. 4B. FIG. 4C shows the drive ring 200 having an inner diameter 304 designed to provide an interference fit with a crankshaft. At the inner diameter 304, a lubricant groove 306 (e.g., an annular ring-shaped groove) is circumferentially disposed near an axial center of the drive ring 200. A lubricant pathway, i.e., a lubricant metering hole 308, fluidly connects the lubricant groove 306 with the lubricant passage 300. The lubricant metering hole 308 allows lubricant to flow between the lubricant groove 306 and the lubricant passage 300. The configuration of the lubricant groove 306 allows the lubricant to flow from the crankshaft's lubricant flow path through the drive ring 200 to the shaft seal cavity 214 without the necessity of the lubricant flow path of the crankshaft being aligned with the hole 308. That is, the hole 308 can be "misaligned" with the position of the lubricant flow path of the crankshaft but the flow of the lubricant will still be directed to the hole 308 via the groove 306.

The drive ring 200 is configured to provide a metered path for lubricant to flow from the crankshaft 112 to the shaft seal cavity 214. Accordingly, the drive ring 200 provides a pressurized shaft seal housing that can provide proper seal lubrication under most, if not all, operating conditions, even when the open-drive compressor is operating in a compressor suction vacuum condition.

The drive ring 200 is also configured to act as a surface 310 for the internal lip seal 210 to ride against. Further, the drive ring 200 is configured to drive the shaft seal 102 with the crankshaft 112.

In some embodiments, the drive ring 200 is composed of steel with an inner diameter that is sized to provide an interference fit with the crankshaft 112. An outer surface of the drive ring 200 can be case hardened designed to run against the lip seal 210. In some embodiments, the lip seal 210 includes, coated with, and/or is made of a synthetic fluoropolymer, such as, for example, polytetrafluoroethylene (PTFE) (e.g., Teflon) by DuPont Co.). Below the outer surface and adjacent to the interference fit area of the drive ring 200 is a socket (e.g., hex socket) that can mate with a nut (e.g., hex nut) pattern machined into a tail end of the shaft seal 102, this socket is configured to drive the shaft seal 102 with the crankshaft 112. The lubricant groove 306 can be cast or machined out of the inner diameter of the drive ring 200 and positioned to align with a lubricant passage in the crankshaft 112. The lubricant metering hole 308 can be drilled from the lubricant groove 306 at a location behind the socket of the drive ring 200. The lubricant groove 306 and the lubricant metering hole 308 can be configured to meter pressurized lubricant (e.g., oil) from the crankshaft 112, through the drive ring 200 and into the shaft seal cavity 214.

In other embodiments, an orifice can be installed in the crankshaft 112 rather than using the lubricant metering hole 308 to convey lubricant into the shaft seal cavity 214.

Also, in other embodiments, the lubricant groove 306 can be replaced by providing a gap between the drive ring 200 and the shaft seal 102 that aligns with the lubricant passage in the crankshaft 112.

Further, in other embodiments, the drive ring 200 can be configured without the lubricant metering hole 308 and the drive ring 200 can be configured to deliver lubricant to the shaft seal cavity 214 at full compressor pump pressure.

As an alternative to the above, or in addition to the above, the TRS controller can include computer executable instructions to methods for extending the lifespan of the shaft seal.

In one embodiment, a method for extending the lifespan of the shaft seal is provided that prevents the open-drive compressor from operating in a compressor suction vacuum condition during the first X amount of time (e.g., ~200 hours) of operation. In some embodiments, the open-drive compressor is configured to operate in the positive pressure condition (e.g., at least +10 psig) during the first X amount of time.

FIG. 5 illustrates one embodiment of a TRS 500 for a transport unit (TU) 525 that is attached to a tractor 520. The TRS 500 includes a TRU 510 that controls refrigeration within an internal space 550 of the TU 525. The TRU 510 is disposed on a front wall 530 of the TU 525. A tractor 520 is attached to and is configured to tow the transport unit 525. It will be appreciated that the embodiments described herein are not limited to trucks and trailer units, but can just as easily apply to any other suitable temperature controlled apparatuses such as a ship board container, an air cargo container or cabin, an over the road truck cabin, among others. The TRS 500 may further comprise a programmable TRS controller 555 that may comprise a single integrated control unit 560 or that may comprise a distributed network of control elements 560, 565. The number of distributed control elements in a given network will depend upon the particular application of the principles described herein.

Figure 6:
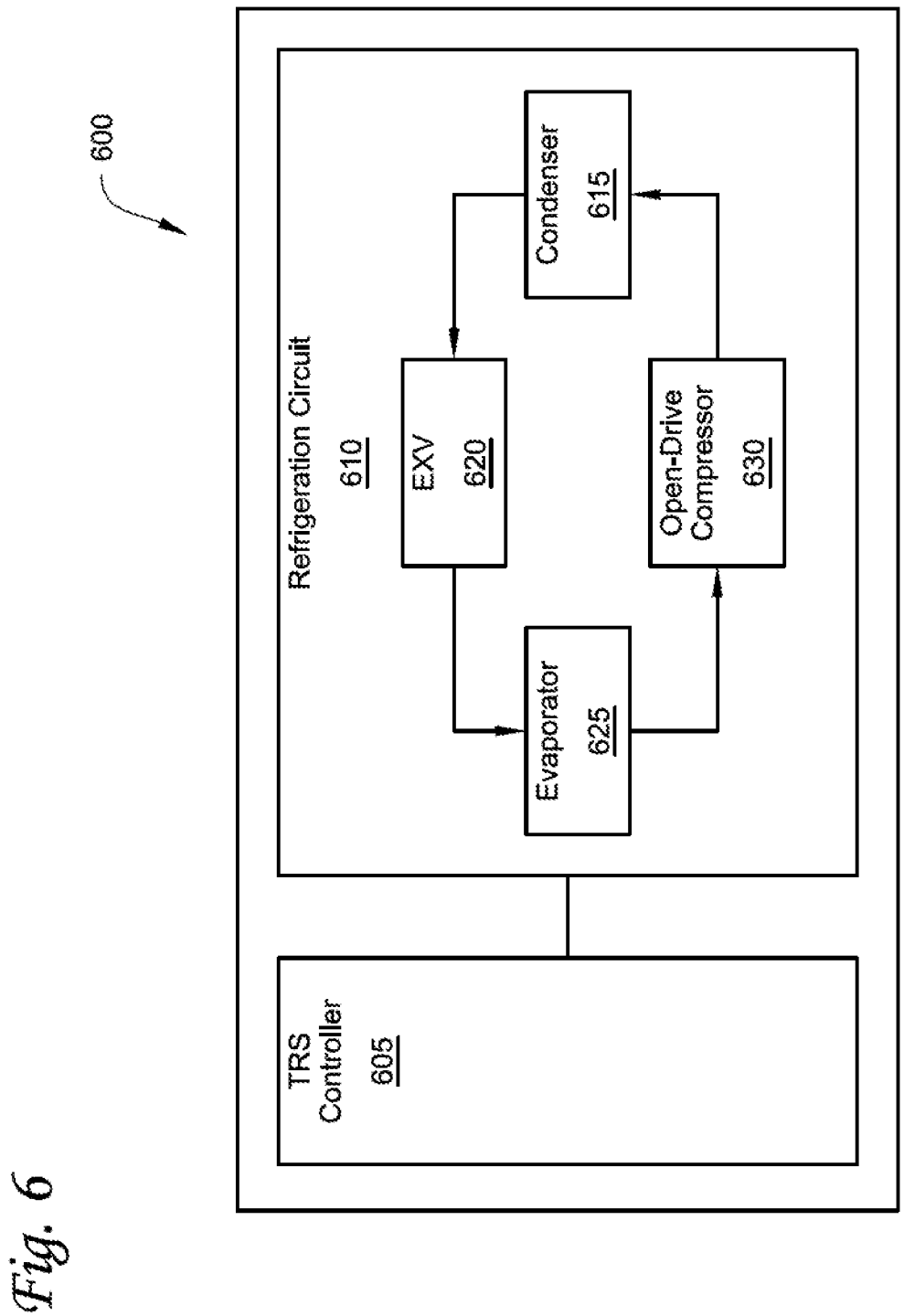
FIG. 6 illustrates a block diagram of a TRU, according to one embodiment.

FIG. 6 illustrates a non-limiting block diagram of several components within a TRU 600, according to one embodiment. The TRU 600 includes a TRS Controller 605 and a refrigeration circuit 610.

The TRS Controller 605 is connected to and configured to control the refrigerant circuit 610. The TRS Controller 605 controls the refrigeration circuit 610 to obtain various operating conditions (e.g., temperature, humidity, etc.) of an internal space (e.g., the internal space 550 shown in FIG. 5)

of a transport unit and can be powered by a genset (not shown) of the TRS and/or another power source (not shown) (e.g., a battery).

The refrigeration circuit 610 regulates various operating conditions (e.g., temperature, humidity, etc.) of the internal space based on instructions received from the TRS Controller 605. The refrigeration circuit 610 includes a condenser 615, an expansion valve (EXV) 620, an evaporator 625 and an open-drive compressor 630 that together cool the internal space and any perishable cargo contained therein. The refrigeration circuit 610 can also include an electronic throttle valve (ETV) (not shown) that is configured to control the amount of refrigerant that flows to the open-drive compressor.

Figure 7:
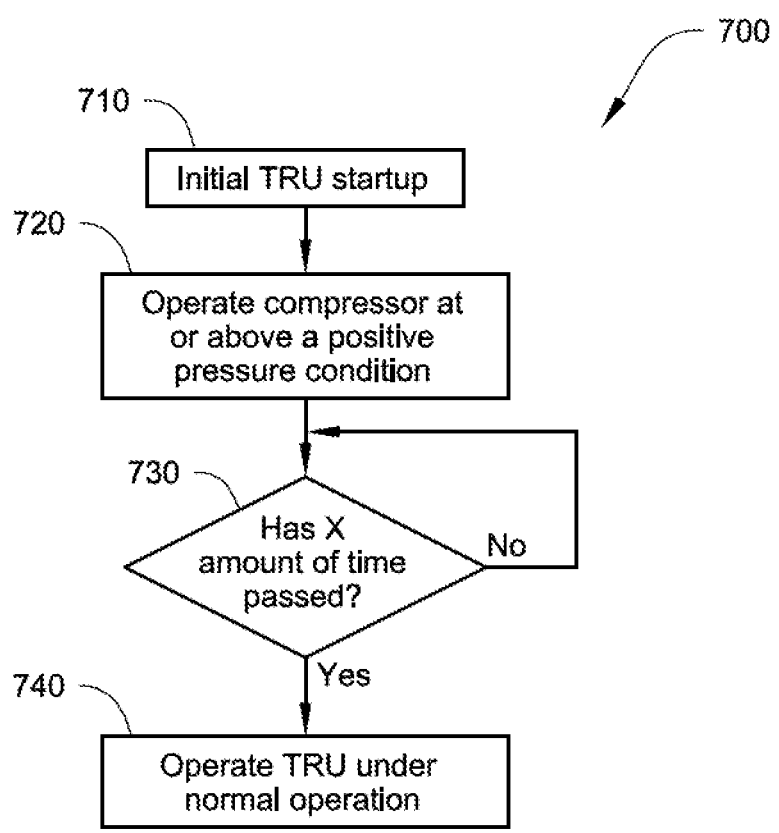
FIG. 7 illustrates a flowchart of a process for extending the lifespan of the shaft seal, according to one embodiment.

FIG. 7 illustrates a flowchart of a process 700 for extending the lifespan of the shaft seal. It has been found that that damage to the shaft seal is most significant during the shaft seal wear in period. The process 700 prevents the open-drive compressor from operating in a suction pressure vacuum condition during the initial wear in period of the shaft seal. After this point, the likelihood of a failure of the shaft seal due to poor lubrication has been found to be reduced significantly.

The process 700 begins at 710, where the TRU is operated for the first time. At 720, a TRS controller of the TRU is configured to control an ETV of an open-drive compressor such that the open-drive compressor continuously operates in a positive pressure condition. In some embodiments, the positive pressure condition occurs when the open-drive compressor is operating at least +10 psig.

At 730, the TRS controller determines whether the open-drive compressor has been continuously operating in the positive pressure condition for X amount of time. If so, the process 600 proceeds to 740. If not, the process returns to 730.

At 740, the TRS controller operates the TRU under normal operation conditions to manage refrigeration of a cargo space of a transport unit. Under normal operation conditions, the TRS controller can control the open-drive compressor via the ETV in order to manage refrigeration of a cargo space of a transport unit, whereby the open-drive compressor may be required to operate in a suction pressure vacuum condition.

In another embodiment, a method for extending the lifespan of the shaft seal is provided that limits the continuous time that the open-drive compressor is allowed to stay in a compressor suction vacuum condition. In particular, the method is configured to initiate a positive pressure condition (e.g., at least +10 psig) for a second time period $T_2$ (e.g., ~3 minutes) after the open-drive compressor is determined to have operated in a compressor suction vacuum condition for a continuous first time period $T_1$ (e.g., ~1 hour). After the second time period $T_2$ has lapsed, the open-drive compressor will return to normal operation that allows the open-drive compressor to operate in a compressor suction vacuum condition in order to maintain improved temperature control. The positive pressure condition forces lubricant (e.g., oil) back between the seal faces of the seal shaft. Thus, the shaft seal will not be deprived of lubricant long enough to cause seal face damage and cause a refrigerant or lubricant leak.

Figure 8:
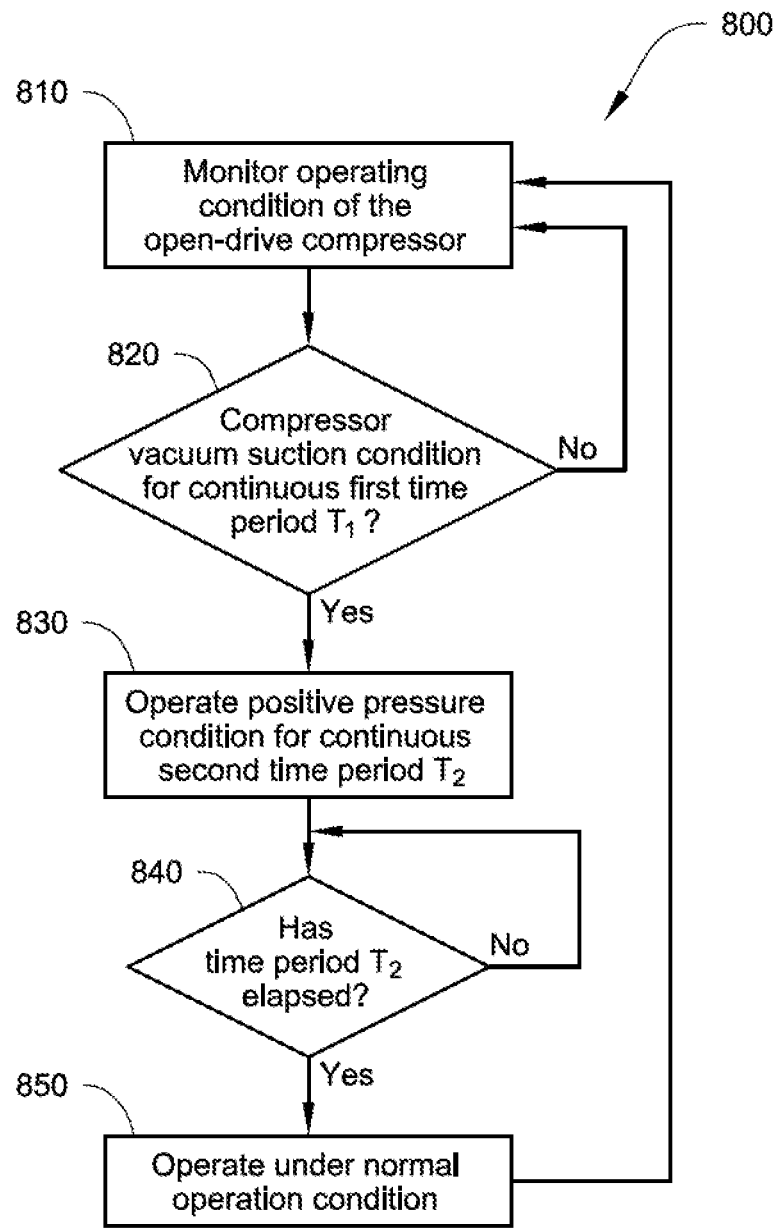
FIG. 8 illustrates a flowchart of a process for extending the lifespan of the shaft seal, according to another embodiment.

FIG. 8 illustrates a flowchart of a process 800 for extending the lifespan of the shaft seal. The process 800 limits the continuous time that the open-drive compressor is allowed to stay in a compressor suction vacuum condition.

The process 800 begins at 810, where a TRS controller monitors an operating condition of the open-drive compressor. At 820, the TRS controller determines whether the open-drive compressor is operating under a compressor suction vacuum condition for a continuous first time period $T_1$. When the open-drive compressor is operating under a compressor suction vacuum condition, lubricant intended to lubricate the shaft seal is sucked back into the compressor instead of being fed to the shaft seal, which can lead to damage of the shaft seal. In some embodiments, the first time period $T_1$ is about 1 hour. If the open-drive compressor is operating under the compressor suction vacuum condition for the continuous first time period $T_1$, the process 800 proceeds to 830. If the open-drive compressor is not operating under the compressor suction vacuum condition for the continuous first time period $T_1$, the process 800 process proceeds back to 810.

At 830, the TRS controller controls an ETV such that the open-drive compressor operates in a positive pressure condition (e.g., at least +10 psig) for a continuous second time period $T_2$. In some embodiments, the second time period $T_2$ is about 3 minutes. The positive pressure condition forces lubricant (e.g., oil) back between the seal faces of the seal shaft. Thus, the shaft seal will not be deprived of lubricant long enough to cause seal face damage and cause a refrigerant or lubricant leak.

At 840, the TRS controller determines whether the time period $T_2$ has elapsed. If so, the process 800 proceeds to 850. If not, the process returns to 840. At 840, the TRS controller controls the TRU under normal operation conditions to manage refrigeration of a cargo space of a transport unit. Under normal operation conditions, the TRS controller can control the open-drive compressor via the ETV in order to manage refrigeration of a cargo space of a transport unit, whereby the open-drive compressor may be required to operate in a suction pressure vacuum condition. The process 800 then returns to 810.

Figure 9:
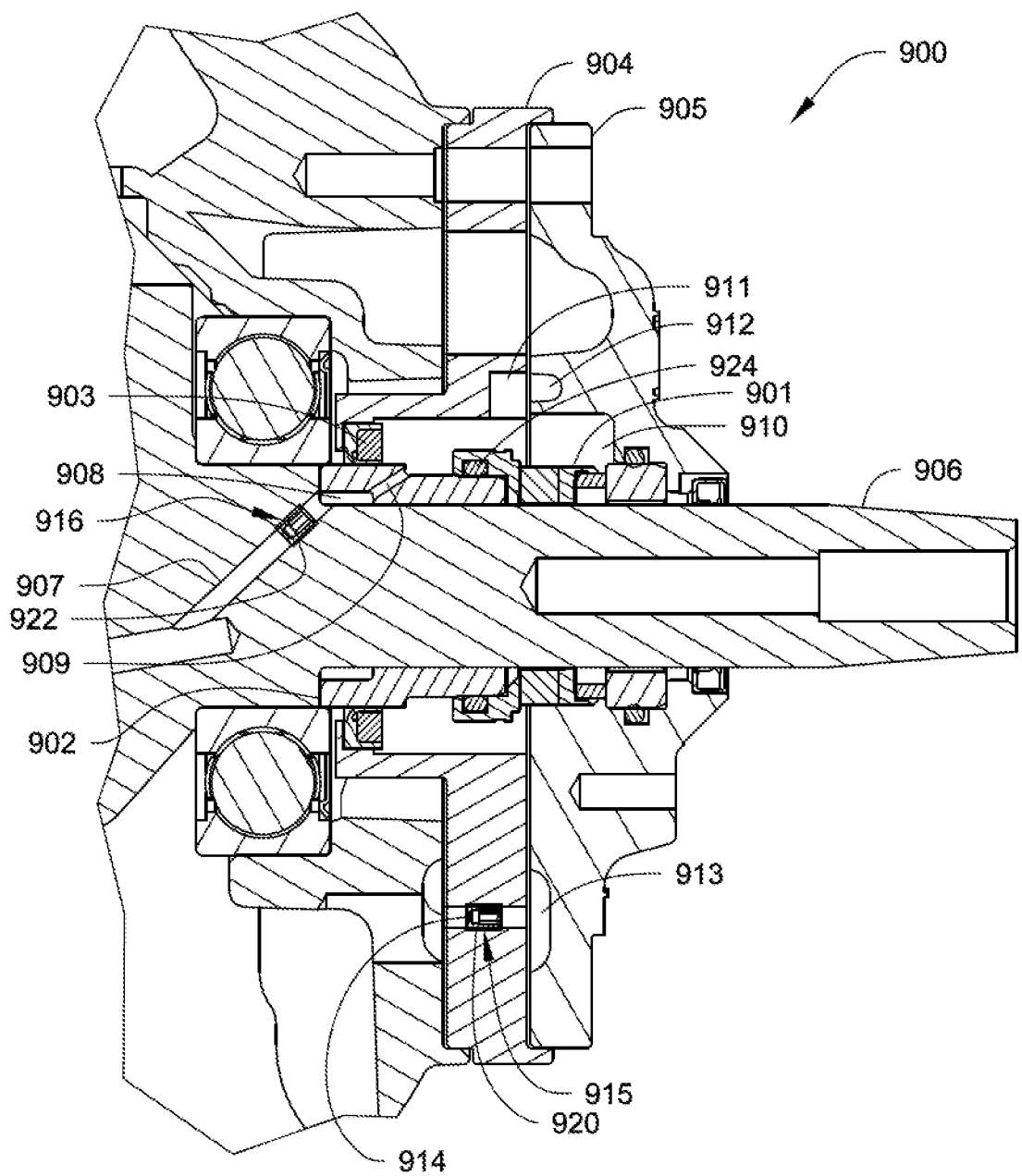
FIG. 9 illustrates a partial sectional view of an open drive compressor, according to an embodiment.

FIG. 9 shows a portion of an open-drive compressor 900 (which can be similar to the compressor 104 shown in FIG. 1) according to an embodiment that can supply pressurized lubricant (e.g., oil) to a shaft seal 901 even when an open-drive compressor 900 is operating in a compressor suction vacuum condition.

The open-drive compressor 900 includes the shaft seal 901, a drive ring 902 (e.g., a drive shaft insert), a lip seal 903, a compressor housing insert 904, and a compressor seal cover 905. The lip seal 903 surrounds the drive ring 902. The drive ring 902 engages via an interference fit with the crankshaft 906. The drive ring 902 engages the shaft seal 901 via an o-ring 924. The compressor housing insert 904 is disposed between the main body portion of the compressor and the seal cover 905. The crankshaft 906 protrudes out and away from the seal cover 905. The drive ring 902 can also include a surface (or portions thereof) for the lip seal 903 to ride against. The drive ring 902 can further drive the shaft seal 901 with the crankshaft 906.

The open-drive compressor 900 has a lubricant flow path therethrough made of one or more of the components listed above. The flow of the lubricant is directed from an oil pump (not shown) through a lubricant flow path 907 (e.g., a hole) in the crankshaft 906. Then the flow of the lubricant is directed to one side of the drive ring 902, wherein an annular ring-shaped groove 908 in a surface of the one side of the drive ring 902 receives the flow of the lubricant from the lubricant flow path 907 and can direct the lubricant around the crankshaft 906 and through a hole 909 in the drive ring 902. The configuration of the annular ring-shaped groove 908 and the hole 909 allows the lubricant to flow from the crankshaft's lubricant flow path 907 through the drive ring 902 without the necessity of the lubricant flow path 906 having to be aligned with the hole 909. That is, the hole 909 can be "misaligned" with the position of the lubricant flow path 906 (e.g., circumferentially and/or radially), but the flow of the lubricant will still be directed to the hole 909 from the lubricant flow path 906 via the annular ring-shaped groove 908. This can be a particular advantage during manufacturing and/or maintenance of the compressor 900. From the hole 909, the flow of the lubricant enters and fills, at least partially, a shaft seal cavity 910 which surrounds the shaft seal 901. The shaft seal cavity 910 is a volume defined by one or more of the portions of the shaft seal 901, the drive ring 902, the lip seal 903, the compressor housing insert 904, and the compressor seal cover 905. The hole 909 can restrict the flow of the lubricant into and/or out from the shaft seal cavity 910. That is, the hole 909 can have a smaller diameter than, for example, the diameter of the lubricant flow path 907. The lubricant which enters the shaft seal cavity 910 is pressurized and/or becomes pressurized. The lubricant is then directed to a lubricant flow path 911 of the housing insert 904 and to a lubricant flow path 912 of the seal cover 905. The lubricant flow path 912 of the seal cover 905 then directs the flow of the lubricant to a lubricant out portion 913 which mates with an exit hole 914 in the housing insert 904. The exit hole 914 can include a lubricant flow restrictor 915 for maintaining the lubricant pressure contained in the shaft seal cavity 910 at positive pressure over suction pressure. The lubricant from the exit hole 914 is then directed out of the compressor. For example, the lubricant exiting the exit hole 914 can be directed to an oil sump (not shown).

The lubricant flow path 906 in the crankshaft 906 can include another lubricant flow restrictor 916 for reducing the pressure of the lubricant (e.g., oil) entering the shaft seal cavity 910 to an intermediate pressure between pump and sump pressures, and for providing adequate restriction such that failure of the lip seal 903 will not cause the rest of the compressor 900 to lose lubricant pressure.

The open-drive compressor 900 is configured to maintain a positive pressure in the shaft seal cavity 910. For example, if a compressor suction vacuum condition occurs, the open-drive compressor 900 has structural components that can maintain a positive pressure over suction in the shaft seal cavity 910 so that lubricant loss to various components (e.g., shaft seal 901) is prevented.

An example of a structural component which can maintain the positive pressure in the shaft seal cavity 910 is the lubricant flow restrictor 915, which is positioned downstream of the shaft seal cavity 910. The lubricant flow restrictor 915 can be, for example, a drilled hole having a diameter that is smaller than the lubricant out portion 913 and/or the lubricant flow path 912 of the seal cover 905.

Another example of the lubricant flow restrictor 915 is a device 920 having a first end and a second end axially opposing the first end, wherein a lubricant flow channel connects the first end to the second end for directing the flow of the lubricant, and restrict the back flow of the lubricant from the seal cavity 910 when under vacuum pressure (e.g., suction pressure condition) from the oil pump side of the compressor 900. For example, the first end can have a diameter that is larger than the diameter of the second end.

Another example of a structural component which can help maintain the positive pressure in the shaft seal cavity 910 is the lubricant flow restrictor 916, which is positioned upstream of the shaft seal cavity 910. The lubricant flow restrictor 916 can be, for example, a drilled hole having a diameter that is smaller than the lubricant flow path 907.

Another example of the lubricant flow restrictor 916 is a device 922 having a first end and a second end axially opposing the first end, wherein a lubricant flow channel connects the first end to the second end for directing the flow of the lubricant. The device 922 is configured for reducing the pressure of the lubricant (e.g., oil) entering the shaft seal cavity 910 to an intermediate pressure between pump and sump pressures, and for providing adequate restriction such that failure of the lip seal 903 will not cause the rest of the compressor 900 to lose lubricant pressure. For example, the first end can have a diameter that is smaller than the diameter of the second end.

Figure 10:
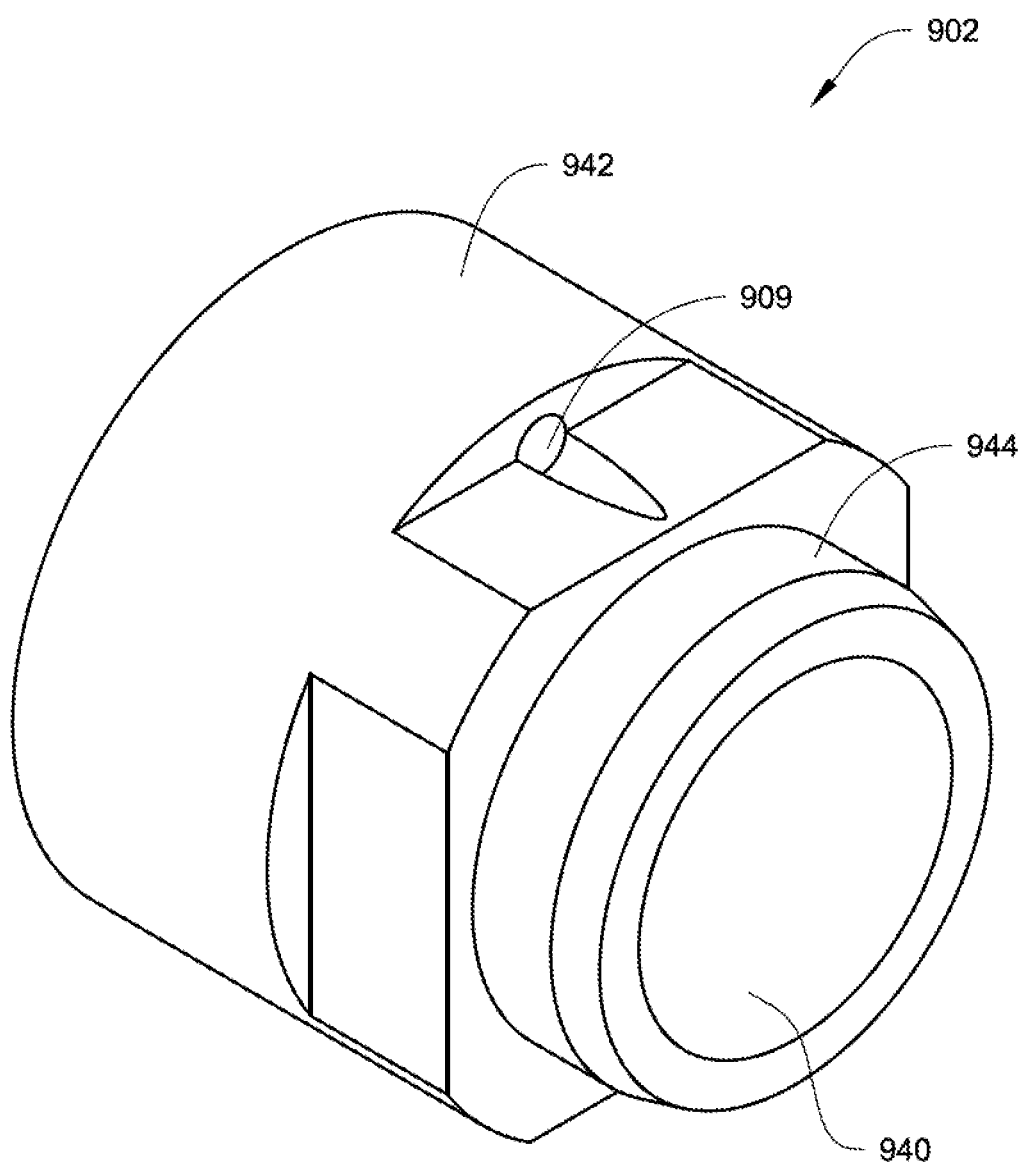
FIG. 10 illustrates a perspective view of a drive ring shown in FIG. 9.

FIG. 10 shows a perspective view of the drive ring 902. The drive ring 902 includes the annular ring-shaped groove (not shown; 908 shown in FIG. 9) in a surface of the innder side of the drive ring 902. The annular ring-shaped groove receives the flow of the lubricant from the lubricant flow path 907 and is connected to for directing the lubricant to the hole 909 (lubricant path through the body of the drive ring 902). Thus, the lubricant is directed to flow from one side (e.g., the crankshaft side) to the shaft seal cavity side. The drive ring 902 is configured to provide a metered path for lubricant to flow from the crankshaft side to the shaft seal cavity side.

The drive ring 902 has an opening 940 for receiving the crankshaft. The drive ring 902 has a lip seal engagement surface portion 942 which is a portion of an outer surface for engaging with the lip seal. The drive ring 902 has a shaft seal engagement surface portion 944 which is a portion of the outer surface for engaging with the shaft seal. In other embodiments, the shaft seal engagement surface portion is a portion of an inner surface and is configured to mate with the shaft seal.

Figure 11:
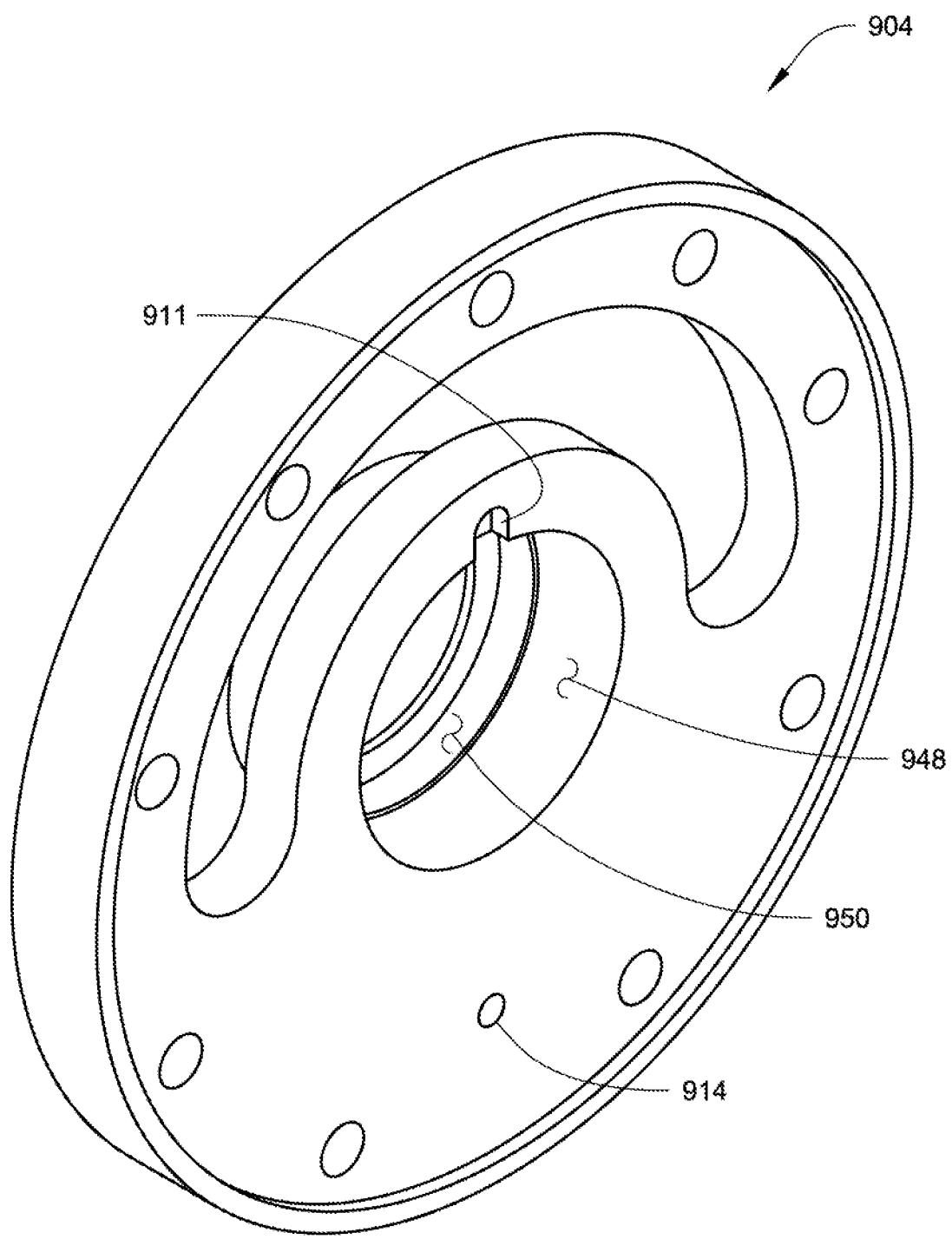
FIG. 11 illustrates a perspective view of a compressor housing insert shown in FIG. 9.

FIG. 11 shows a perspective view of the compressor housing insert 904, showing the side which faces the compressor seal cover (905 shown in FIGS. 9 and 12) of the compressor 900. The compressor housing insert 904 is configured to fit between the compressor body and the compressor's housing seal cover. The compressor housing insert 904 includes a lubricant flow path 911 (e.g., a groove; also shown in FIG. 9) for directing the flow of the lubricant from the shaft seal cavity to a lubricant flow path (912 shown in FIGS. 9 and 12) in the seal cover (905 shown in FIGS. 9 and 12). That is, the lubricant flow path 911 mates with the lubricant flow path (912 shown in FIG. 12) for directing the flow of the lubricant. The compressor housing insert 904 has an inner surface portion 948 for defining, at least in part, the shaft seal cavity (910 shown in FIG. 9). The compressor housing insert 904 also has another surface potion 950 which can engage with the lip seal for preventing leakage of the lubricant and/or containing the lubricant in the seal cavity. The compressor housing insert 904 includes a lubricant outlet hole 914 for receiving the flow of the lubricant from the lubricant out portion (913 shown in FIGS. 9 and 12) of the seal cover and directing the flow of the lubricant out of the compressor 900. The lubricant can be directed to, for example, an oil sump.

Figure 12:
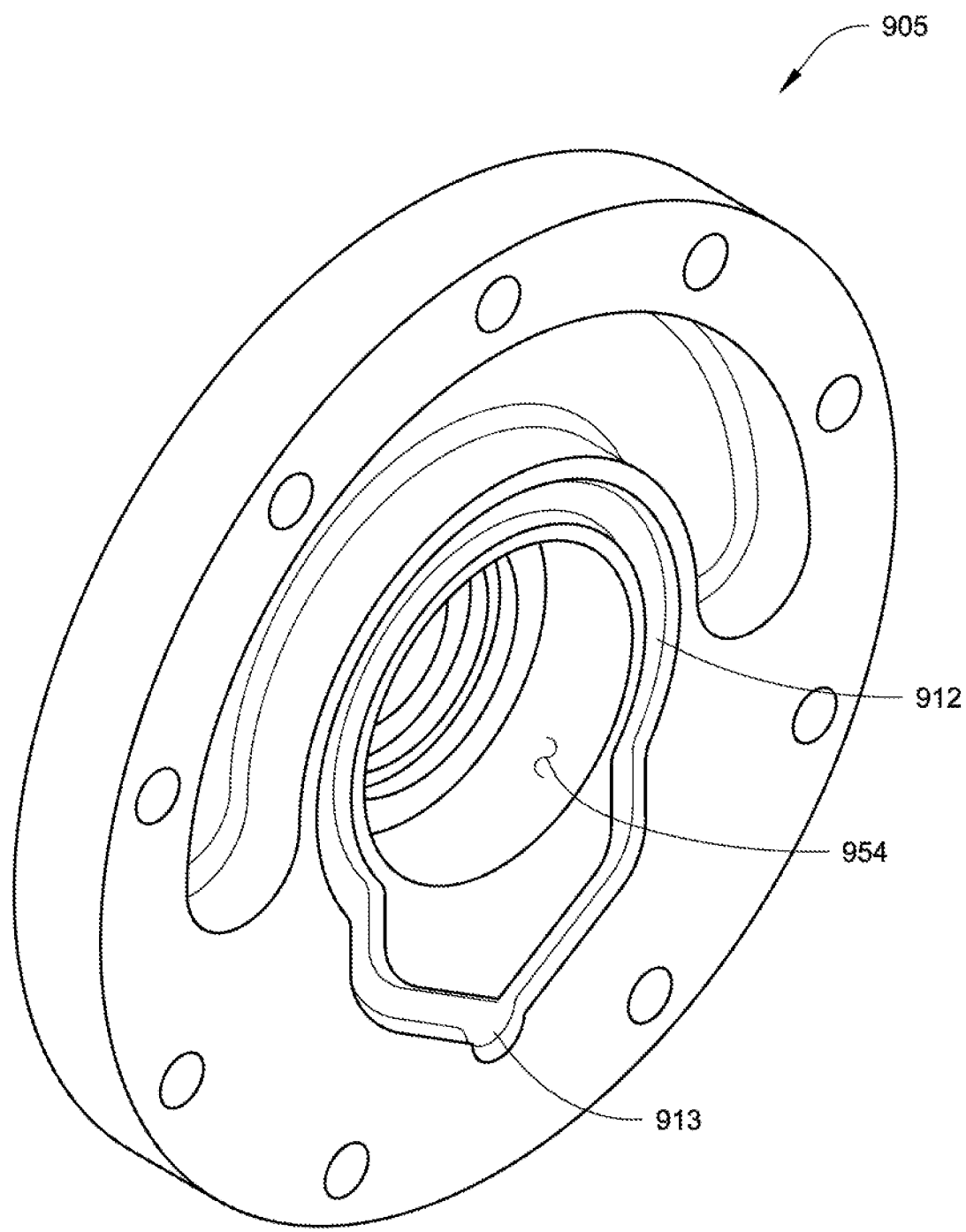
FIG. 12 illustrates a perspective view of a seal cover shown in FIG. 9.

FIG. 12 shows a perspective view of the shaft seal cover 905, showing the side which faces the compressor housing insert (904 shown in FIGS. 9 and 11). The seal cover 905 includes an inner surface portion 954 which, in part, defines the shaft seal cavity (910 in FIG. 9). The seal cover 905 includes a lubricant flow path 912 (e.g., groove; also shown in FIG. 9) which engages with and/or mates with the lubricant flow path (911 shown in FIGS. 9 and 11) of the compressor housing insert (904 shown in FIGS. 9 and 11). The lubricant flow path 912 directs the flow of the lubricant received from the lubricant flow path (911 shown in FIGS. 9 and 11) of the compressor housing insert and directs the flow of the lubricant to the lubricant outlet portion 913 (also shown in FIG. 9). The lubricant outlet portion 913 of the lubricant flow path 912 engages with and/or mates with the lubricant outlet hole (914 shown in FIGS. 9 and 11) of the compressor housing insert (904 shown in FIGS. 9 and 11).

The embodiment shown in FIGS. 9-12 has a lubricant flow path which is directed substantially along the axial direction of the compressor 900. For example, the compressor 900 includes components (e.g., the shaft seal 901, the drive ring 902, and the lip seal 903, which help define the lubricant flow path in the compressor 900) which are disposed generally along the axial direction of the crankshaft 906. To accommodate the arrangement of these generally axially disposed components, the compressor 900 includes the compressor housing insert 904 which can make the compressor 900 relatively large (e.g., long along an axial direction). An advantage of the compressor 900 is that its manufacture can be relatively easy and/or production costs can be relatively low. In comparison, the embodiment shown in FIGS. 2A-2B provide the compressor 104 that can be more compact than the embodiment shown in FIG. 9 because the lubricant flow path is directed substantially along the radial direction of the compressor 104. For example, the compressor 104 includes components (e.g., the shaft seal 102, the drive ring 200, and the lip seal 210, which help define the lubricant flow path in the compressor 104) which are disposed generally along a radial direction from the crankshaft 112.

Figure 13:
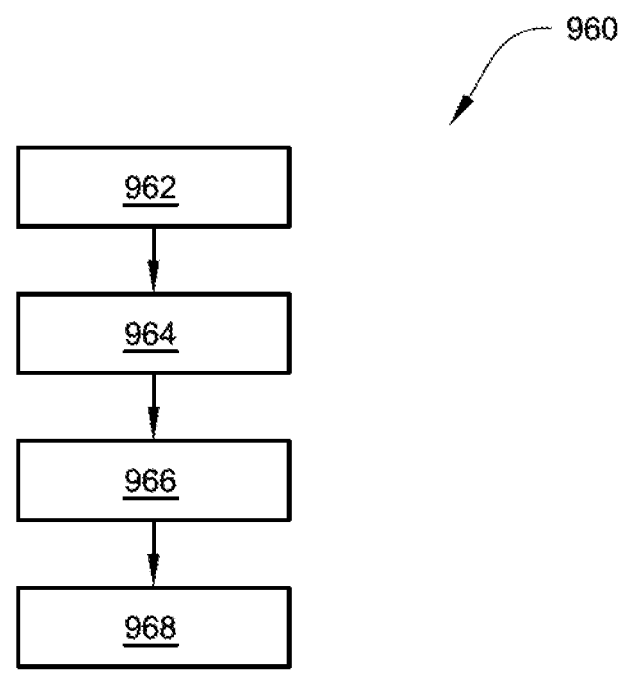
FIG. 13 illustrates a flow chart of a process for extending the lifespan of the shaft seal, according to an embodiment.

FIG. 13 illustrates a flowchart of a process 960 for maintaining a positive pressure above suction in an open-drive compressor. The process 960 includes directing the flow of the lubricant to a shaft seal cavity of the open-drive compressor at a positive lubricant pressure 962, filling at least a part of the shaft seal cavity with the lubricant at the positive lubricant pressure 964, directing the flow of the lubricant from the shaft seal cavity through a downstream flow restrictor 966, and restricting the flow of the lubricant flowing through the downstream flow restrictor and maintaining the positive lubricant pressure in the shaft seal cavity 968. At 968, maintaining the positive lubricant pressure in the shaft seal cavity is achieved even when, for example, an oil pump connected to the open-drive compressor is providing a suction pressure (i.e., negative pressure) instead of positive pressure to the compressor. These steps 962, 964, 966, 968 are all happening continuously. None of the steps 962, 964, 966, 968 need wait for the previous to complete. Generally, the oil pump will always deliver oil at positive pressure. However, when the oil pump fails to deliver oil at positive pressure, the compressor suction pressure is in a vacuum condition, but a pressurized seal cavity will be maintained.

Figure 14A:
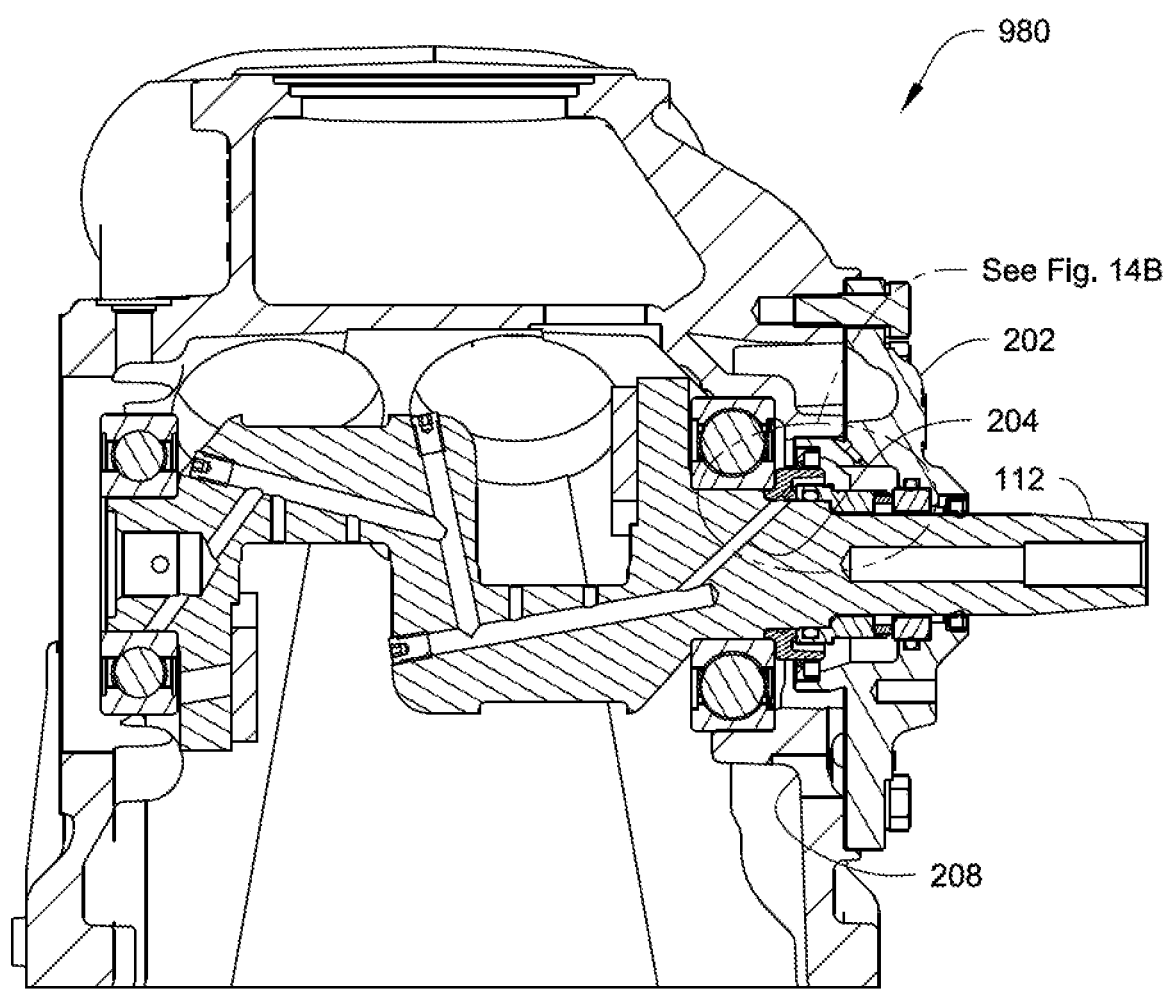
FIG. 14A illustrates a cross-sectional side view of an open drive compressor, according to an embodiment.
Figure 14B:
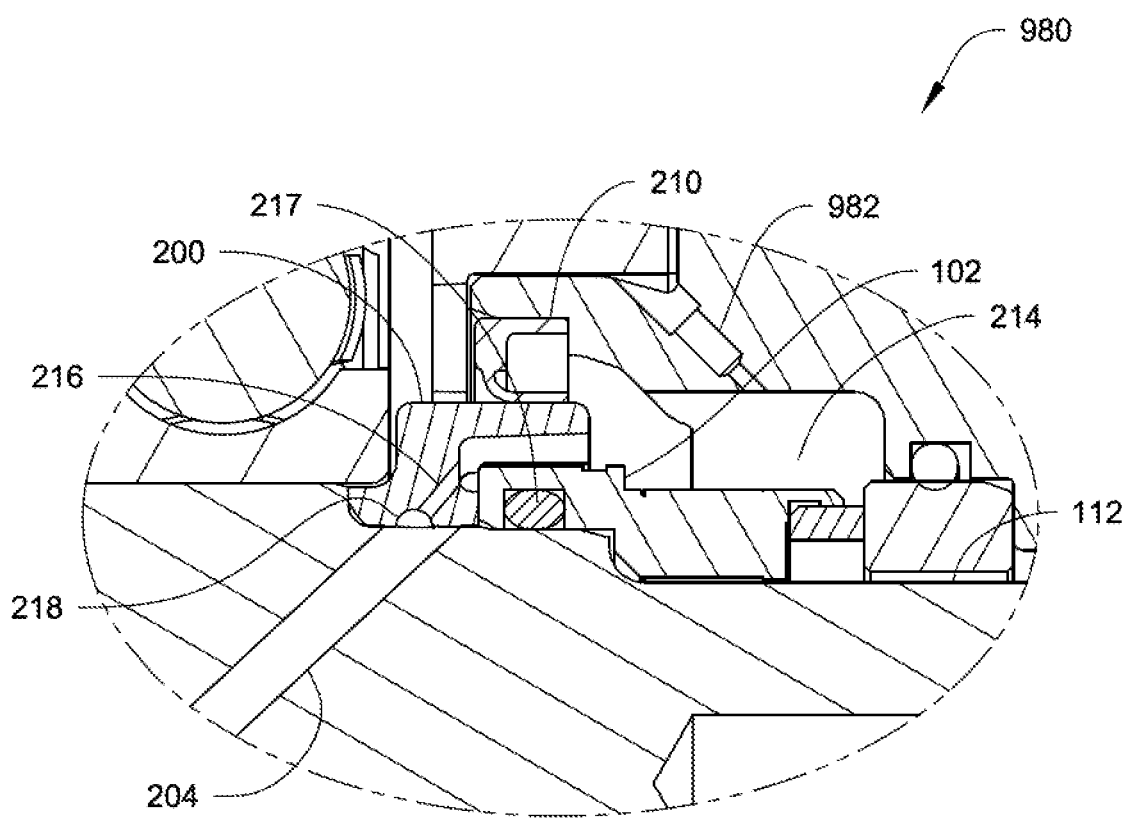
FIG. 14B illustrates a detailed view of a portion of FIG. 14A.

FIGS. 14A and 14B show another embodiment of the open-drive compressor 980. Structures shown in FIGS. 14A and 14B that are similar to and/or correspond to the structures shown in FIGS. 2A and 2B are labeled with the same reference labels. Accordingly, FIGS. 2A and 2B can be referred to for the descriptions of the structures labeled with the same reference labels.

FIG. 14A shows a detailed view of a cutaway side view of the open-drive compressor 980. FIG. 14A shows the crankshaft 112 and a shaft seal cover 202. A lubricant flow path 204 (which can be considered to be a portion of a total lubricant flow path in the compressor 980) provides lubricant from a lubricant pump at high pressure to lubricate the shaft seal. After lubrication of the shaft seal 102, the lubricant flows via another lubricant flow path 208 (which can be considered to be another portion of a total lubricant flow path in the compressor 980) for draining the lubricant back to the lubricant pump at a low pressure. The lubricant flow path 204 is upstream of the lubricant flow path 208. FIG. 14A shows a ball bearing 206 that assists in rotating the crankshaft 112. A section of FIG. 14A is shown in greater detail in FIG. 14B.

FIG. 14B shows a detailed portion of the cutaway side view shown in FIG. 14A. FIG. 14B shows the crankshaft 112 which is surrounded by a lip seal 210 which covers the shaft seal and the drive ring 200. The shaft seal cover 202 is in contact with the lip seal 210. A shaft seal cavity 214 is disposed in a region defined by the shaft seal cover 202, the shaft seal 102, the drive ring 200, and the lip seal 210. The shaft seal cover 202 includes a metering hole 982, which acts as a lubricant flow restrictor. The metering hole 982 can be a drilled hole. The metering hole 982 restricts the flow of the lubricant to maintain a positive pressure of the lubricant contained in the shaft seal cavity 214. The lubricant flow path 204 is upstream of the shaft seal cavity 214. The lubricant flow path 208 is downstream of the shaft seal cavity 214. The seal cover 202 includes a lubricant flow path for directing the flow of the lubricant from the shaft seal cavity 214 to the lubricant flow path 208.

Aspects:

It is noted that any of the features in any of the aspects below can be combined with any of the other aspects. Accordingly, any of the aspects 1-9, 10-12, 13-22, 23-31, 32-33, 34-36 and 37-39 can be combined.

1. A drive ring for an open-drive compressor for engaging a shaft seal of the open-drive compressor, wherein the open-drive compressor includes a crankshaft, a lip seal, and a shaft seal engaging the crankshaft, the drive ring comprising:

a portion of a surface for the lip seal of the open-drive compressor to ride against to drive the shaft seal with the crankshaft; and a flow path for directing a flow of lubricant from one side of the drive ring to a shaft seal cavity side of the drive ring.

2. The drive ring according to aspect 1, wherein the flow path comprises a metering hole connecting the one side of the drive ring to the shaft seal cavity side.

3. The drive ring according to any of the aspects 1-2, wherein the flow path comprises an annular ring-shaped groove around a portion of an inner surface for directing the flow of the lubricant from the one side of the drive ring to the metering hole.

4. The drive ring according to aspect 3, wherein the flow path comprises an annular ring-shaped groove around a portion of an inner surface for directing the flow of the lubricant.

5. The drive ring according to aspect 4, wherein the annular ring-shaped groove runs in a circumferential direction around the portion of the inner surface.

6. The drive ring according to any of the aspects 1-5, further comprising another portion of the surface comprising three or more engagement portions for fitting with the shaft seal.

7. The drive ring according to aspect 6, wherein the surface includes an outer surface and an inner surface of a generally annular shaped body, wherein the three or more engagement portions are disposed at the inner surface.

8. The drive ring according to any of the aspects 1-7, wherein the surface includes an outer surface and an inner surface of a generally annular shaped body, wherein the three or more engagement portions are disposed at the outer surface.

9. The drive ring according to any of the aspects 1-8, wherein the portion of the surface is configured to fit a hexagonal fit engagement for fitting with the shaft seal.

10. A method for maintaining a positive pressure above suction for a lubricant contained in an open-drive compressor, the method comprising:
   directing a flow of the lubricant to a shaft seal cavity of the open-drive compressor at the positive pressure above suction;
   filling at least a part of the shaft seal cavity with the lubricant at the positive pressure above suction;
   directing the flow of the lubricant from the shaft seal cavity through a downstream flow restrictor; and
   restricting the flow of the lubricant flowing through the downstream flow restrictor and maintaining the positive pressure above suction for the lubricant in the shaft seal cavity.

11. The method according to aspect 10, wherein the positive lubricant pressure in the shaft seal cavity is maintained even when a suction pressure is provided to the compressor.

12. The method according to any of the aspects 10-11, further comprising:
   directing the flow of the lubricant through an upstream flow restrictor of the open-drive compressor, wherein the upstream flow restrictor directs the flow of the lubricant to the shaft seal cavity.

13. An open-drive compressor, comprising:
   a shaft seal cavity configured to contain a lubricant at a positive pressure above suction;
   a lubricant flow path connected to the shaft seal cavity for directing a flow of lubricant; and
   a lubricant flow restrictor disposed at a portion of the lubricant flow path, wherein the lubricant flow restrictor is configured to restrict the flow of the lubricant from the shaft seal cavity so that the lubricant contained in the shaft seal cavity is maintained at the positive pressure above suction.

14. The open-drive compressor according to aspect 13, wherein the lubricant flow restrictor is disposed downstream of the shaft seal cavity.

15. The open-drive compressor according to any of the aspects 13-14, further comprising an upstream lubricant flow restrictor, wherein the upstream lubricant flow path is disposed upstream of the shaft seal cavity.

16. The open-drive compressor according to any of the aspects 13-15, wherein the lubricant flow restrictor includes a hole having a diameter that is smaller than the diameter of the lubricant flow path.

17. The open-drive compressor according to any of the aspects 13-17, wherein the flow restrictor is configured to maintain a predetermined pressure range of the lubricant in the shaft seal cavity.

18. The open-drive compressor according to aspect 17, wherein the predetermined pressure range of the lubricant in the shaft seal cavity is positive above suction pressure.

19. The open-drive compressor according to any of the aspects 13-18, further comprising:
   a crankshaft;
   a shaft seal engaging the crankshaft at a seal housing, wherein the shaft seal cavity is disposed surrounding the shaft seal; and
   a drive ring engaging the crankshaft via an interference fit, the drive ring engaging the shaft seal via an o-ring, the drive ring including an annular ring-shaped lubricant groove for directing the flow of the lubricant from one side of the drive ring to the shaft seal cavity.

20. The open-drive compressor according to aspect 19, wherein the drive ring includes a metered hole for directing the flow of the lubricant from the annular ring-shaped lubricant groove to the shaft seal cavity.

21. The open-drive compressor according to any of the aspects 19-20, further comprising a lip seal disposed around the drive ring.

22. The open-drive compressor according to any of the aspects 19-21, wherein the lip seal includes polytetrafluoroethylene.

23. A compressor system, comprising:
   an open-drive compressor:
   a crankshaft;
   a shaft seal engaging the crankshaft at a seal housing; and
   a drive ring engaging the shaft seal, the drive ring including lubricant grooves that provides lubricant to flow from one side of the drive ring to the shaft seal, wherein a predetermined volume of lubricant under pressure can be maintained near the shaft seal.

24. The compressor system according to aspect 23, further comprising an oil pump connected to the open-drive compressor for providing a flow of lubricant.

25. The compressor system according to any of the aspects 23-24, further comprising an upstream flow restrictor disposed between the oil pump and the shaft seal, the upstream flow restrictor being configured to restrict a flow of lubricant away from the shaft seal due to suction due to a negative pressure caused by the oil pump.

26. The compressor system according to any of the aspects 23-25, further comprising a lubricant outlet which allows lubricant above the predetermined amount to flow away from the shaft seal.

27. The compressor system according to any of the aspects 23-26, further comprising a computer readable medium storing computer executable instructions for operating a compressor, when executed by a processor, the processor carries out a method comprising:
   preventing the compressor from operating in a vacuum for a predetermined amount of time; and
   after the predetermined amount of time has passed, the compressor is allowed to operate in the vacuum.

28. The compressor system according to any of the aspects 23-27, wherein the predetermined amount of time is 200 hours.

29. The compressor system according to any of the aspects 23-28, further comprising a computer readable medium storing computer executable instructions for operating the open-drive compressor, when executed by a processor, the processor carries out a method comprising:
   operating the open-drive compressor to have a first suction pressure for a first predetermined amount of time; and
   operating the open-drive compressor to have a second suction pressure that is greater than the first suction pressure for a second predetermined amount of time, wherein the second predetermined amount of time is less than the first predetermined amount of time, and allowing a lubricant to flow back to the shaft seal.

30. The compressor according to aspect 29, wherein the first predetermined amount of time is 1 hour, and the second predetermined amount of time is 3 minutes.

31. The compressor according to any of any of the aspects 29-30, wherein the second suction pressure is +10 psig.

32. A computer readable medium storing computer executable instructions for operating an open-drive compressor, when executed by a processor, the processor carries out a method comprising:
   preventing the open-drive compressor from operating in a vacuum for a predetermined amount of time; and after the predetermined amount of time has passed, the open-drive compressor is allowed to operate in the vacuum.

33. The computer readable medium according to aspect 32, wherein the predetermined amount of time is 200 hours.

34. A computer readable medium storing computer executable instructions for operating an open-drive compressor, when executed by a processor, the processor carries out a method comprising:
    operating the open-drive compressor to have a first suction pressure for a first predetermined amount of time; and
    operating the open-drive compressor to have a second suction pressure that is greater than the first suction pressure for a second predetermined amount of time, wherein the second predetermined amount of time is less than the first predetermined amount of time, and allowing a lubricant to flow back to a shaft seal.

35. The computer readable medium according to aspect 34, wherein the first predetermined amount of time is 1 hour, and the second predetermined amount of time is 3 minutes.

36. The computer readable medium according to any of the aspects 34-35, wherein the second suction pressure is +10 psig.

37. A method for directing lubricant through an open-drive compressor, the method comprising:
    directing a flow of a lubricant via a lubricant flow path in a crankshaft of the open-drive compressor;
    directing the flow of the lubricant received from the lubricant flow path in the crankshaft to an annular ring-shaped groove of a drive ring of the open-drive compressor;
    directing the flow of the lubricant from the ring-shaped groove of the drive ring to a hole in the drive ring;
    directing the flow of the lubricant received from the hole in the drive ring to a shaft seal cavity of the open-drive compressor; and
    containing at least a portion of the lubricant in the shaft seal cavity.

38. The method according to aspect 37, wherein the hole in the drive ring restricts the flow of the lubricant to and from the shaft seal cavity.

39. The method according to any of aspects 337-38, wherein containing at least the portion of the lubricant in the shaft seal cavity includes maintaining a pressure in the shaft seal cavity at a positive pressure above suction.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A drive ring for an open-drive compressor for engaging a shaft seal of the open-drive compressor, wherein the open-drive compressor includes a crankshaft having a lubricant channel positioned within the crankshaft, the shaft seal engaging the crankshaft, the drive ring comprising:
    one or more engagement surfaces in direct contact with the shaft seal; and
    a flow path for directing a flow of lubricant away from the crankshaft, and from one side of the drive ring to a shaft seal cavity side of the drive ring, and
    wherein the flow path receives the flow of lubricant from the lubricant channel positioned within the crankshaft.

2. The drive ring of claim 1, wherein the flow path comprises an annular ring-shaped groove around a portion of an inner surface for receiving the flow of the lubricant from the lubricant channel positioned within the crankshaft.

3. The drive ring of claim 1, wherein the flow path comprises an annular ring-shaped groove around a portion of an inner surface for directing the flow of the lubricant.

4. The drive ring of claim 3, wherein the annular ring-shaped groove runs in a circumferential direction around the portion of the inner surface.

5. The drive ring of claim 1 wherein there are three or more engagement surfaces in contact with the shaft seal.

6. An open-drive compressor, comprising:
    a crankshaft, having a first lubricant flow path within the crankshaft;
    a shaft seal cavity; and
    a drive ring, directly contacting the crankshaft, including a groove configured to receive a lubricant from the first lubricant flow path, and a second lubricant flow path configured to direct lubricant from the groove to the shaft seal cavity, wherein the first lubricant flow path is configured to direct the lubricant at a first lubricant pressure and the second lubricant flow path is configured to direct the lubricant at a second lubricant pressure that is greater than the first lubricant pressure.

7. The open-drive compressor of claim 6, further comprising a lubricant pump configured to direct lubricant into the first lubricant flow path and wherein the first lubricant flow path includes a lubricant flow restrictor configured to reduce a pressure of a lubricant to the first lubricant pressure, wherein the first lubricant pressure is between a pump pressure of the lubricant pump and a sump pressure.

8. The open-drive compressor of claim 6, further comprising a compressor housing insert including a lubricant outlet configured to direct lubricant out of the compressor.

9. The open-drive compressor of claim 8, further comprising a shaft seal cover, wherein the shaft seal cover defines at least part of the shaft seal cavity, and wherein the shaft seal cover includes a third lubricant flow path configured to direct lubricant to the lubricant outlet hole.

10. The open-drive compressor of claim 9, further comprising a lubricant flow restrictor located in the third lubricant flow path, wherein a third lubricant pressure between the lubricant flow restrictor and the lubricant outlet hole is less than the second lubricant pressure.

11. The open-drive compressor of claim 6, wherein a diameter of the second lubricant flow path is smaller than a diameter of the first lubricant flow path.

12. The open-drive compressor of claim 6, wherein lubricant within the shaft seal cavity is pressurized.

13. The open-drive compressor of claim 6, further comprising a shaft seal, and wherein the drive ring includes one or more engagement surfaces in direct contact with the shaft seal.

14. The open-drive compressor of claim 10, wherein the lubricant flow restrictor is a hole having a diameter smaller than at least one of a diameter of the lubricant outlet and a diameter of the third lubricant flow path.

15. A drive ring for an open-drive compressor, wherein the open-drive compressor includes a crankshaft and a shaft seal engaging the crankshaft, the drive ring comprising:
    a flow path for directing a flow of lubricant away from the crankshaft, the flow path passing from one side of the drive ring to a shaft seal cavity side of the drive ring, wherein the drive ring drives rotation of the shaft seal.

16. The drive ring of claim 15, wherein the flow path includes a metering hole connecting the one side of the drive ring to the shaft seal cavity side.

17. The drive ring of claim 16, wherein the flow path includes a groove formed in a portion of an inner surface of the drive ring for directing the flow of the lubricant from the one side of the drive ring to the metering hole.

18. The drive ring of claim 17, wherein the groove is an annular, ring-shaped groove.

19. The drive ring of claim 15, wherein an inner surface of the drive ring is configured to form an interference fit with the crankshaft.

20. The drive ring of claim 15, wherein the drive ring drives the shaft seal by engaging the shaft seal at three or more engagement portions on a surface of the drive ring.

* * * * *